United States Patent [19]

Gray

[11] 4,314,447

[45] Feb. 9, 1982

[54] REFRIGERANT MOTOR

[75] Inventor: Kenneth P. Gray, E. Syracuse, N.Y.

[73] Assignee: Carrier Corporation, Syracuse, N.Y.

[21] Appl. No.: 53,875

[22] Filed: Jul. 2, 1979

[51] Int. Cl.³ .................. F01K 25/00; F01L 25/02
[52] U.S. Cl. ............................ 60/671; 91/319; 91/337; 417/401
[58] Field of Search ............... 60/651, 671; 417/377, 417/379, 401; 62/333; 91/319, 313, 304, 337

[56] References Cited

U.S. PATENT DOCUMENTS

| | | | |
|---|---|---|---|
| 433,055 | 7/1890 | Tellier | 417/379 |
| 795,761 | 7/1905 | Fulton | 60/641 |
| 862,867 | 8/1907 | Eggleston | 417/390 |
| 2,467,413 | 4/1949 | Wildhack | 417/401 |
| 2,620,628 | 12/1952 | Ray | 417/401 |
| 2,688,923 | 9/1954 | Bonaventura et al. | 417/379 |
| 2,826,149 | 3/1958 | Wrigley | 91/319 |
| 3,937,599 | 2/1976 | Thureau et al. | 417/389 |
| 3,963,383 | 6/1976 | Hill | 417/401 |
| 4,036,017 | 7/1977 | Siegel | 60/497 |
| 4,048,981 | 9/1977 | Hobbs | 126/271 |
| 4,061,131 | 12/1977 | Bohanon | 126/271 |
| 4,068,476 | 1/1978 | Kelsey | 60/671 |
| 4,104,008 | 8/1978 | Hoffmann et al. | 417/397 |

FOREIGN PATENT DOCUMENTS

881278  6/1953  Fed. Rep. of Germany ........ 91/319

Primary Examiner—A. Michael Chambers
Attorney, Agent, or Firm—J. Raymond Curtin; Robert P. Hayter

[57] ABSTRACT

Apparatus for converting energy contained within a stream of gaseous refrigerant to mechanical work. A refrigerant motor utilizing a diaphragm dividing a chamber into an equalizing chamber and a driving chamber is utilized with appropriate valve means causing the refrigerant to flow into and out of the driving chamber. A rod connected to the diaphragm reciprocates to deliver work to the appropriate work piece. Both rocker arm and spool valve embodiments are shown for providing the appropriate valve arrangements.

3 Claims, 3 Drawing Figures

4,314,447

REFRIGERANT MOTOR

BACKGROUND OF THE INVENTION

1. Field of the Invention

The present invention relates to a motor for converting energy contained in a refrigerant to mechanical motion. More specifically, the present invention concerns a motor adapted to utilize gaseous refrigerant for displacing a diaphragm to create mechanical motion.

2. Description of the Prior Art

The utilization of the gaseous refrigerant of a refrigeration circuit having an evaporator and a condenser for driving a diaphragm type mechanical device for creating reciprocal mechanical movement is disclosed herein. Utilization of various valve means to accomplish this is also disclosed.

This motor is particularly applicable to refrigeration circuits wherein heat energy is being transferred from a high temperature source to a low temperature sink. Typical of this type of circuit would be a refrigeration circuit having an evaporator mounted in heat exchange relation with a solar collector such that heat energy from the sun is transferred to the refrigerant. A condenser is then located in a heat sink such that the energy transferred to the refrigerant is then conducted to the heat sink. In the vapor line connecting the evaporator to the condenser, the disclosed motor may be mounted such that part of the energy contained in the refrigerant is converted into mechanical energy. This mechanical energy may then be used to drive a pump for circulating refrigerant through the system or may be used for some other external operation such as driving a generator or a compressor of a separate vapor compression refrigeration system. For a more particular description of the varied uses of this type of motor please see patent application entitled "Refrigerant Solar Energy System and Method Therefor," Ser. No. 054,392, filed simultaneously herewith. Prior art devices have used refrigerant for driving a diaphragm against a hydraulic circuit for pumping water. Such a system, however, does not utilize heat energy transfer nor does it incorporate the various valve and other diaphragm techniques claimed herein.

The present invention includes a chamber divided into a driving chamber and an equilibrium chamber by a diaphragm. Gaseous refrigerant is allowed to enter the driving chamber under certain conditions such that the chamber is expanded. During expansion of the chamber, the diaphragm moves and a rod connected thereto is also displaced. An exit port is provided from the driving chamber such that gaseous refrigerant may be discharged therefrom and the diaphragm returned to its original position. Return means may be provided in conjunction with the diaphragm such that the diaphragm may be forced to its original position. A valve arrangement is utilized to control the entry and discharge of refrigerant gas into the driving chamber of the motor.

SUMMARY OF THE INVENTION

It is an object of this invention to provide a refrigerant motor for converting the internal energy of refrigerant into mechanical motion.

It is a further object of the present invention to provide a motor which may be utilized within a self-contained refrigeration circuit for transferring heat from high temperature source to low temperature sink such that a refrigeration circuit may operate without the input of additional energy to cycle the refrigerant.

A further object of the present invention is to provide a safe, economical and reliable to manufacture motor powered by gaseous refrigerant.

These and other objects are achieved according to a preferred embodiment of the present invention by the utilization of a chamber divided into an equalizing chamber and a driving chamber by a diaphragm. The appropriate use of entry ports and discharge ports allows for the diaphragm to be displaced depending upon the volume of gas allowed into the driving chamber. A spring may be utilized to return the diaphragm to the starting position under the appropriate conditions. A rod attached to the diaphragm is utilized to deliver mechanical work such as to reciprocate a piston for circulating refrigerant.

Two types of valve arrangements are disclosed herein. In one, a rocker arm is utilized to alternatingly open and close the entry port and discharge port of the driving chamber. In the other embodiment a spool valve is utilized to make the flow connections to have the refrigerant follow the appropriate path either being discharged from the driving chamber or flowing into the driving chamber.

DESCRIPTION OF THE PREFERRED EMBODIMENT

The refrigerant motors herein are described in conjunction with a closed refrigeration circuit wherein gaseous refrigerant produced at a high temperature source by vaporizing liquid refrigerant is utilized as the energy source for the motor. It is to be understood that this motor may be used with other refrigeration applications wherein a gaseous refrigerant has a potential for driving a motor. In addition thereto, valving arrangements will be described herewith. It is to be further understood that the exact nature of the valving may be determined to be other than described and accomplish the same purpose and function. Additionally, with the valving described in the rocker arm embodiment it is obvious that such a device may utilize an overcenter spring or similar device to quickly cause the rocker arm to oscillate between the two positions. Additionally, it is anticipated that the refrigerant motor may be utilized to power a piston for circulating refrigerant through a refrigeration circuit. Obviously, the motor has other applications which may be used in any application where it is necessary to generate mechanical movement.

Figure 1:
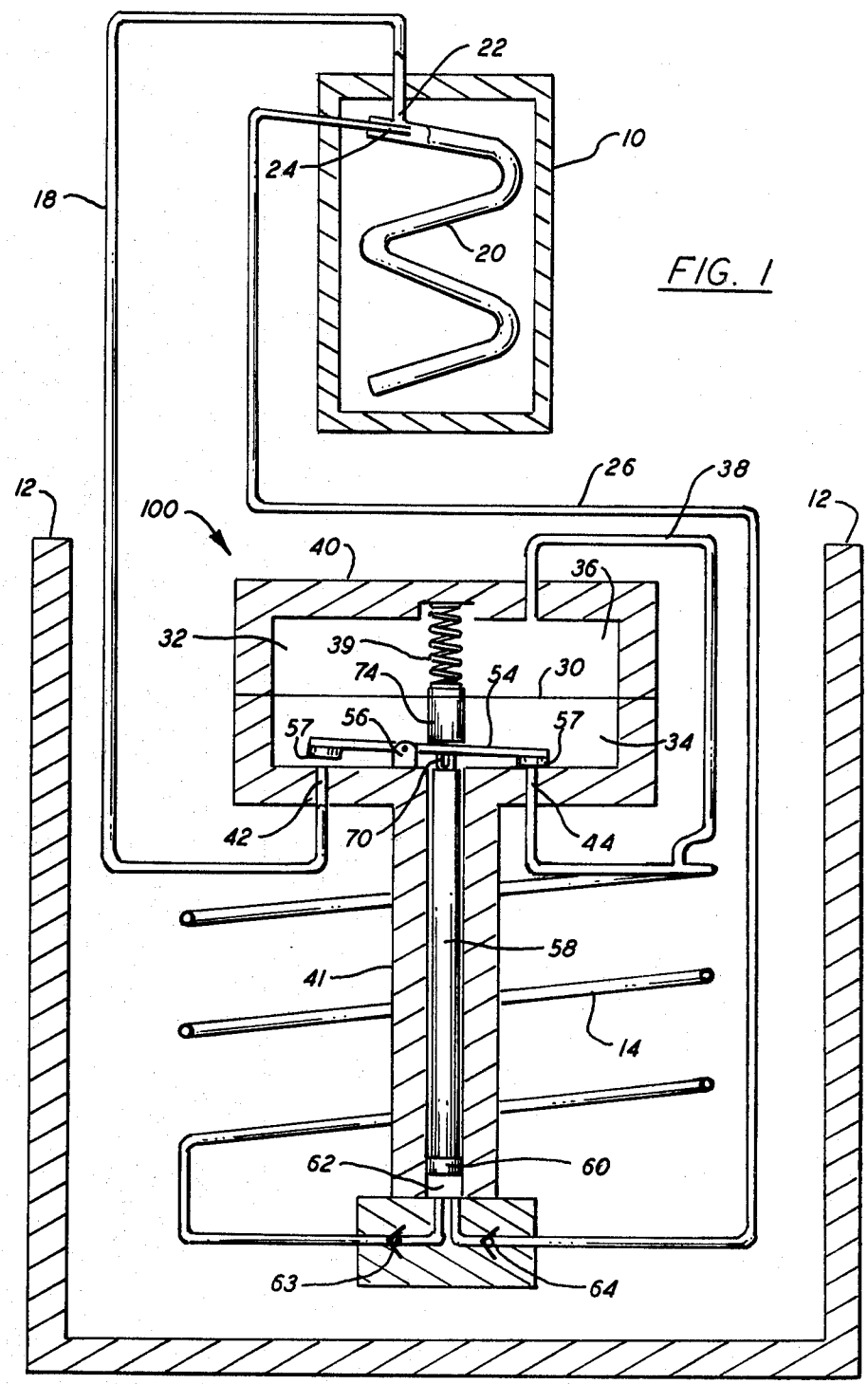
FIG. 1 is a schematic view of a refrigeration circuit utilizing the refrigerant motor to drive a piston for circulating refrigerant throughout the circuit.

Referring now to FIG. 1 it can be seen that evaporator 20 is serpentine in configuration and is mounted within solar collector 10. Solar collector 10 acts to receive the sun's rays as is well known in the art to generate a relatively high temperature level within the collector. Evaporator 20 is mounted within the collector in heat exchange relation with the air or other fluid contained therein such that heat energy is transferred from the collector to the refrigerant within the evaporator. Evaporator 20 has an evaporator gas discharge outlet 22 at the top thereof and an evaporator liquid inlet 24 also entering th top thereof.

Typically, the solar collector is inclined at an angle from horizontal equal to the latitude of the collector location to optimize the exposure of the collection to solar energy. The evaporator within the collector is also inclined such that the liquid refrigerant collects in the bottom thereof and the vaporized refrigerant flows upwardly out the top. The provision of an evaporator liquid inlet at the top of the evaporator provides for a counterflow relation along the serpentine length of the evaporator such that as the liquid flows downwardly by gravity hot gas flows upwardly and energy is effectively transferred between the two flows to promote the vaporization of liquid refrigerant.

Vapor line 18 is connected to evaporator gas discharge outlet 22 and to entry port 42 of casing 40 of the refrigerant motor. Liquid line 26 connects condenser 14 through the pump to evaporator inlet 24.

Refrigerant motor 100 has a casing 40 which defines chamber 32. Diaphragm 30 divides chamber 32 into driving chamber 34 and equalizing chamber 36. Entry port 42 passes through casing 40 to allow vaporized refrigerant from line 18 to enter the driving chamber 34 of refrigerant motor. Discharge port 44 is also formed through casing 40 to allow gaseous refrigerant from driving chamber 34 to be discharged into condenser 14. Bypass line 38 is provided for equalizing the pressure between the equalizing chamber 36 and the condenser 14.

Mounted within driving chamber 34 is rocker arm 54. Rocker arm 54 is supported by pivotal support 56 intermediate the ends thereof. Rocker arm 54 has valve seats 57 located on either end, one for covering entry port 42 and one for covering discharge port 44. As shown in FIG. 1, the physical dimensions of the clearance space between the ports and their corresponding valve seats are exaggerated. In actuality, the relative displacement of the rocker arm to cover one port and open the other and vice versa is minimal.

Rocker arm 54 is connected by a pin extending through slot 70 to rod 58. Plug 74, a portion of rod 58, extends downwardly from diaphragm 30. Spring 39 is attached to the opposite side of diaphragm 30 from plug 74 and to casing 40. Rod 58 has formed therein slot 70 which the pin extending from rocker arm 54 rides. Piston 60 is attached to the other end of rod 58. Rod 58 and piston 60 travel up and down with the motion of diaphragm 30 within casing extension 41. Piston 60 reciprocates within pump cavity 62 for pumping liquid refrigerant out of condenser 14 back to evaporator 20. Check valves 63 and 64 are provided within condenser 14 and liquid line 26 such that the refrigerant is pumped by the appropriate reciprocating motion of piston 60.

Operation

When a high temperature source is available, liquid refrigerant is vaporized in the evaporator providing a gas at relatively higher temperature and pressure as well as higher internal energy. This gas is allowed to enter driving chamber 34 with the rocker arm in the position shown in FIG. 1. Since discharge port 44 is closed, refrigerant entering the driving chamber acts to expand the chamber displacing diaphragm 30 upwardly. As diaphragm 30 is moved upwardly rod 58 and plug 74 attached to rod 58 move upwardly together with piston 60 drawing liquid refrigerant from condenser 14. When diaphragm 30 is displaced sufficiently rod 58 is also displaced and pin 72 extending from rocker arm 54 (better seen in FIG. 2) engages the rod at the end portion of slot 70 such that the rocker arm is moved upwardly with the rod acting to alter the rocker arm position such that entry port 42 is closed and discharge port 44 is opened. Spring 39 which has been compressed during the expansion of diaphragm 30 now acts to force diaphragm 30 back to the neutral position and to force the gaseous refrigerant within driving chamber 34 through discharge port 44 to condenser 14. As the diaphragm moves downwardly as a result of the spring force of spring 39 the top surface of the slot of the rod contacts pin 72 extending from the rocker arm forcing the rocker arm to rotate clockwise closing discharge port 44 and opening entry port 42 completing the cycle. As the spring is driving the rod downwardly piston 60 forces liquid refrigerant through check valve 64 and liquid line 26 back to the evaporator. Check valve 63 prevents refrigerant flow in the opposite direction. A snap action device such as an overcenter spring may be utilized in conjunction with rocker arm 54 to provide for immediate response between the entry port open and discharge port closed versus entry port closed and discharge port open positions.

Bypass line 38 acts to equalize the pressure between condenser 14 and equalizing chamber 36. Consequently, the pressure in equalizing chamber 36 may be controlled to be that of the condenser such that the necessary energy to move the diaphragm is relatively independent of the ambient temperature. The use of the bypass line acts to maintain a constant pressure differential between the equalizing chamber and the driving chamber regardless of system temperature including evaporator and condenser temperatures.

The entire refrigerant motor 100 and condenser 14 as well as piston 60 are all shown in FIG. 1 located within container 12. In actual operating conditions container 12 might well be a hot water tank filled with fluid such that heat energy of the motor, piston and condenser are all transferred to the fluid within the container.

Figure 2:
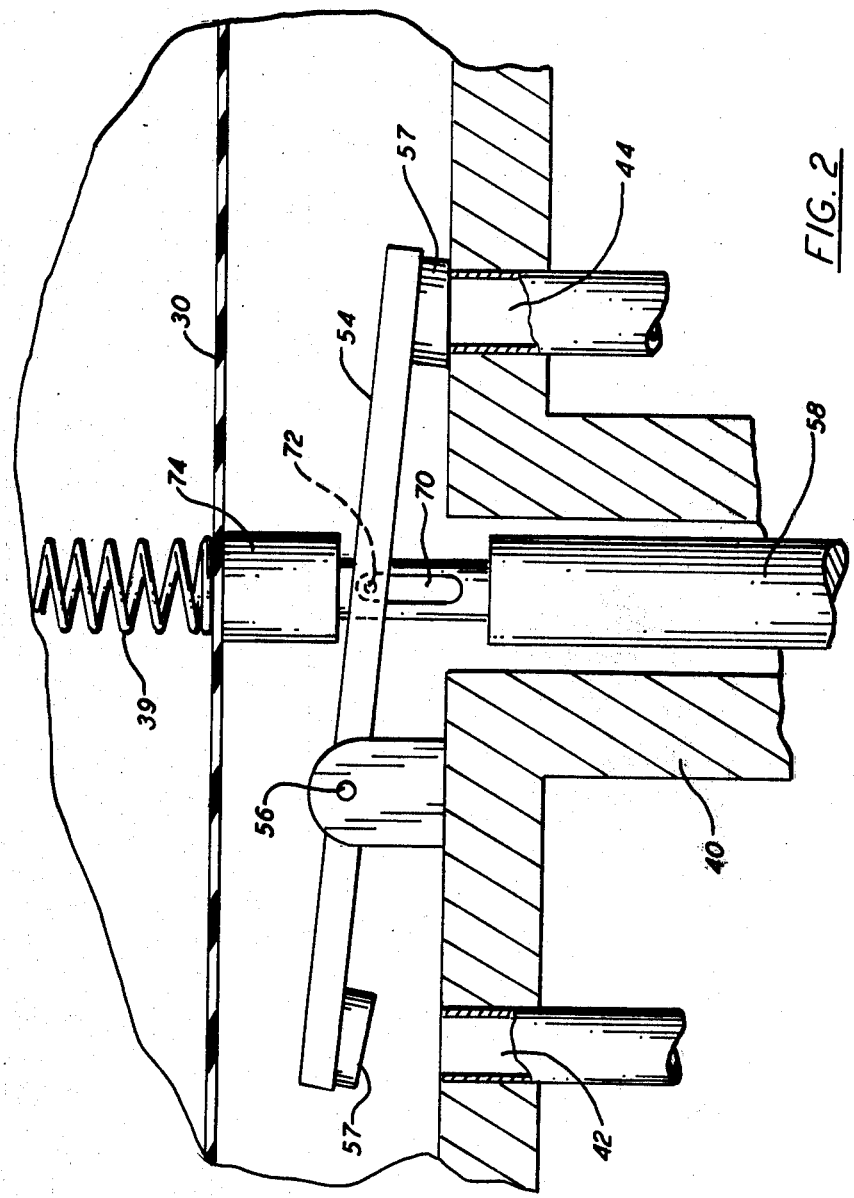
FIG. 2 is an enlarged view of the valve portion of FIG. 1.

FIG. 2 is an enlarged view of the refrigerant motor rocker arm mechanism and rod mechanism of the pump to show the interrelation thereof. Slot 70 and rocker arm pin 72 extending from the rocker arm through the slot may be better seen therein.

It is to be understood that this refrigerant motor may be utilized to operate a compressor of a refrigeration system, an electrical generator or a water pump or other type pump rather than a pump circulating refrigerant.

Alternative Embodiment

Figure 3:
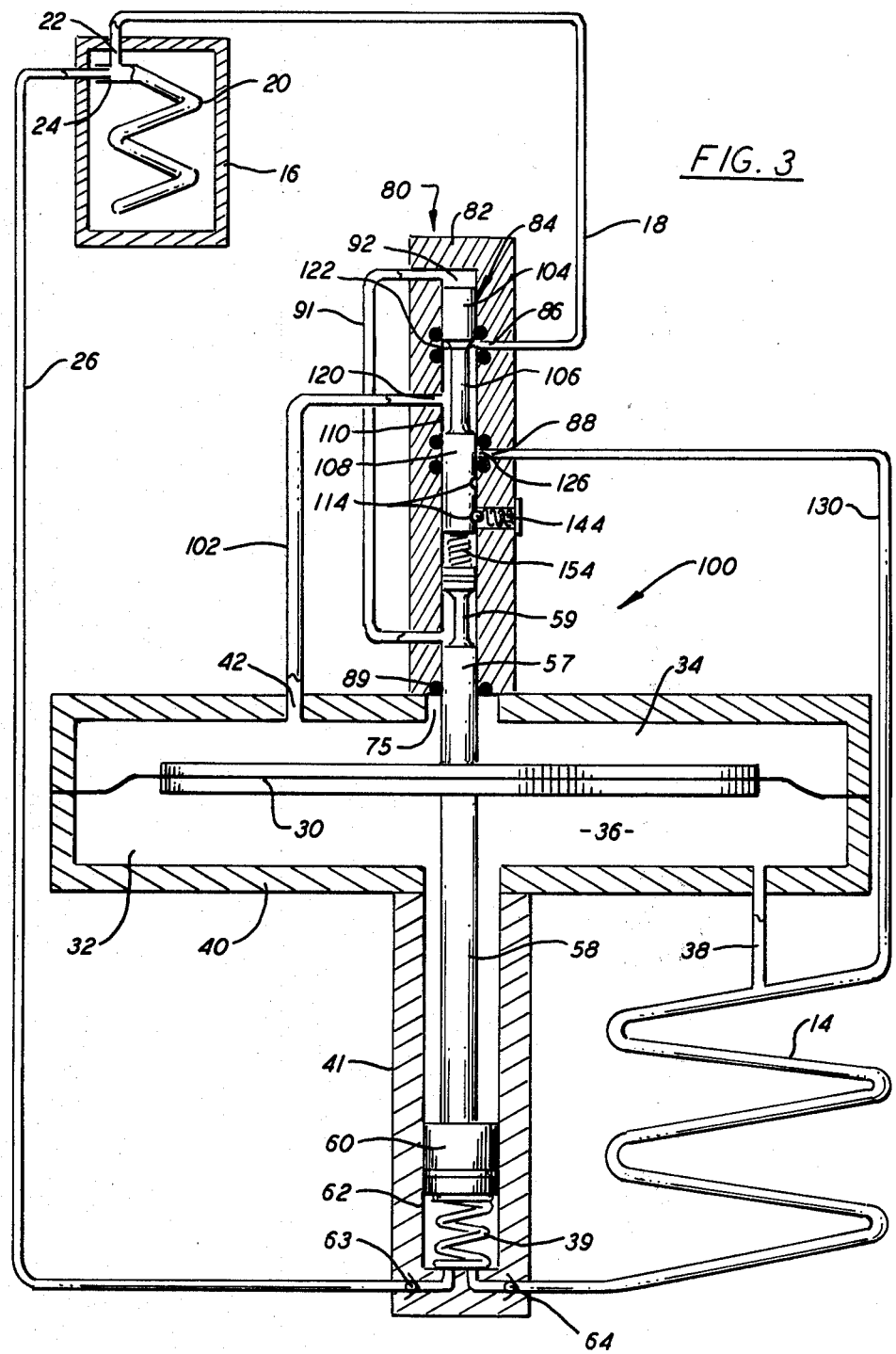
FIG. 3 is a schematic view of a refrigeration circuit showing the refrigerant motor connected to drive a piston and the appropriate valving arrangement.

Referring now to FIG. 3, there can be seen an alternative embodiment of a valve arrangement for use with a refrigerant motor. Many with reference numerals in FIG. 3 coincide with those in FIGS. 1 and 2. However, additional ones have been added to describe the valving arrangement.

In FIG. 3 it can be seen that refrigerant is vaporized in evaporator 20 located within solar collector 16. This gaseous refrigerant is conducted through vapor line 18 to spool valve 80 and enters said valve through valve casing 82 at vapor line inlet 86. Liquid refrigerant enters evaporator 20 through evaporator inlet 24 connected to liquid line 26.

The refrigerant motor has chamber 32 defined by casing 40. Diaphragm 30 divides chamber 32 into equalizing chamber 36 and driving chamber 34. Connected to diaphragm 30 are rod 58 and valve actuator 57. Rod 58 is located to reciprocate within casing extension 41 and is connected to piston 60 which reciprocates within piston cavity 62. Spring 39 is mounted within piston cavity 62 to bias the diaphragm toward the reduction of volume of driving chamber 34. Check valves 63 and 64 are provided to allow for pumping action with the piston. The valving arrangement with the piston could provide for pumping in both directions of motion of the piston.

Connected to spool valve 80 is vapor line extension 130 at vapor line outlet 88. Vapor line extension 130 conducts refrigerant to condenser 14. Bypass line 38 also communicates equalizing chambers 36 with condenser 14. Additionally, connecting line 102 communicates spool valve 80 through common valve port 120 to the driving chamber 34 of the motor at port 42. Casing 40 additionally has discharge port 75 extending therethrough at the point where valve actuator 57 reciprocates. Mounted within spool valve 80 and within valve chamber 110 is spool 84. Spool 84 has a spool end 104, spool middle of reduced diameter 106 and spool end 108. Located within spool end 108 are detent notches 114. Detent spring 144 is located through spool valve casing 82 to engage detent openings 114 of the spool valve. Valve actuator 57 extends through sealing ring 89 into valve chamber 110 of the spool valve. Valve actuator 57 has spool portion 59 at the end thereof. Spool portion 59 is of lesser diameter than the diameter of the valve chamber. Pilot line 91 communicates pilot chamber 92, a portion of valve chamber 110, with a bottom portion of valve chamber 110 adjacent the valve actuator. Spring 154 is provided between spool 84 and valve actuator 59.

Operation

When vaporized refrigerant is supplied through vapor line 18 and the spool valve is in the position shown in FIG. 3 gaseous refrigerant travels through vapor line 18 through vapor line inlet 86 through the valve chamber at the spool middle portion 106 and is discharged out common valve port 120 through connecting line 102 through port 42 to the driving chamber 34 of the motor. As gas follows this path the diaphragm is displaced downwardly moving both valve actuator 57 and rod 58. Downward displacement of rod 58 forces piston 60 downwardly against spring 39 forcing liquid refrigerant through liquid line 26 back to evaporator 24.

Upon the diaphragm being sufficiently displaced spool portion 59 of the valve actuator communicates (through discharge port 75) driving chamber 34 to pilot chamber 92 through pilot line 91. Gaseous refrigerant then flows through the discharge port through the pilot line and into the pilot chamber 92 forcing the valve spool 80 to move downwardly blocking the flow of refrigerant gas into the spool valve through vapor line 18 and further serving to communicate connecting line 102 through common valve port 120 to the vapor line outlet 88 and vapor line extension 130. Additionally, detent spring 144 is dislodged such that the detent spring engages the second of the two detent openings 114 to secure the spool in this second position. In this position the refrigerant gas trapped in driving chamber 34 is discharged as a result of the force applied by spring 39 to diaphragm through port 42 connecting line 102, valve port 120, chamber 110 about the middle portion 106 of the spool through the vapor line outlet 88 into vapor line extension 130 and eventually condenser 14. Refrigerant flow out discharge port 75 through pilot line 91 to the pilot chamber is prevented as the diaphragm moves upwardly and spool portion 59 of valve actuator 57 moves through sealing ring 89 such that there is no communication between discharge port 75 and the pilot chamber. Upon diaphragm 30 returning to its original position the spool portion 59 of valve actuator 57 engages the bottom of spool end 108 of the spool valve and displaces same upwardly. Once the mechanical engagement displaces the valve upwardly, spring 154 acts to continue the displacement upwardly of the spool until detent spring 144 engages the first detent opening 114 securing the spool in the first position. Refrigerant gas may now flow as originally described and the cycle has been completed.

While the invention has been described with a reference to a preferred embodiment it will be understood by those skilled in the art that various changes may be made and equivalents may be substituted for the elements thereof without departing from the scope of the invention. In addition, many modifications may be made to adopt a particular situation or material to teach the invention without departing from the essential skill thereof. Therefore, it is intended that the invention not be limited to the particular embodiments disclosed as the best modes contemplated for carrying out this invention but the invention include all embodiments falling within the scope of the appended claims.

I claim:

1. A motor adapted to convert energy from a stream of gaseous refrigerant flowing through a closed circuit having a high temperature source and a low temperature sink which comprises:
    a casing defining a chamber;
    a flexible diaphragm dividing the chamber into a driving chamber and an equalizing chamber;
    a rod connected to reciprocate with the diaphragm;
    a port for allowing gaseous refrigerant to flow into and out of the driving chamber;
    a spool valve having a valve casing defining a valve chamber and having:
        (a) an inlet valve port for the receipt of gaseous refrigerant from the refrigeration circuit;
        (b) a common valve port for the discharge and receipt of gaseous refrigerant from the entry port of the driving chamber; and
        (c) An exit port for the discharge of gaseous refrigerant to the refrigeration circuit;
    a spool located within the valve chamber having a spool middle portion which communicates inlet valve port with the common port when the spool is in a first position and the common port with the exit port when the spool is in a second position;
    a valve actuator connected to the diaphragm, said valve actuator having an end which engages the end of the spool to move the spool from the second position to the first position and has a spool portion connected to a pilot line for allowing gaseous refrigerant to enter a pilot chamber portion of the valve chamber for displacing the spool from the first position to the second position, said spool portion communicating the driving chamber with the pilot chamber through a pilot line; and
    a pump connected to the rod for circulating refrigerant within the closed circuit.

2. The apparatus as set forth in claim 1 further including means to bias the diaphragm towards reducing the size for the driving chamber.

3. The apparatus as set forth in claim 1 wherein the spool has notches formed therein and further including:
    detent means for securing the spool in either a first position or a second position.

* * * * *